United States Patent
Miyajima et al.

(10) Patent No.: US 7,533,748 B2
(45) Date of Patent: May 19, 2009

(54) VEHICLE MOUNTING STRUCTURE FOR FUEL CELL

(75) Inventors: Kazuyoshi Miyajima, Utsunomiya (JP); Ayumu Ishizuka, Utsunomiya (JP); Ken Takahashi, Shimotsuga-gun (JP); Makoto Anazawa, Utsunomiya (JP); Takashi Kato, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 11/040,360

(22) Filed: Jan. 20, 2005

(65) Prior Publication Data

US 2005/0173170 A1 Aug. 11, 2005

(30) Foreign Application Priority Data

Jan. 22, 2004 (JP) ............... 2004-014276

(51) Int. Cl.
*B60K 1/04* (2006.01)
(52) U.S. Cl. .................. 180/68.5; 903/908; 903/952
(58) Field of Classification Search ............. 180/65.1, 180/65.3, 291, 292, 68.5; 903/908, 952; 429/34, 35, 37
See application file for complete search history.

(56) References Cited

U.S. PATENT DOCUMENTS

| | | | | |
|---|---|---|---|---|
| 4,642,274 A | * | 2/1987 | Tsutsumi et al. | 429/35 |
| 5,543,241 A | * | 8/1996 | Nishioka et al. | 429/39 |
| 6,479,180 B1 | * | 11/2002 | Uozumi | 429/34 |
| 6,622,809 B2 | * | 9/2003 | Takahashi | 429/68.5 |
| 6,662,891 B2 | * | 12/2003 | Misu et al. | 180/68.1 |
| 6,720,101 B1 | * | 4/2004 | Dong et al. | 429/32 |
| 6,874,588 B2 | * | 4/2005 | Kato et al. | 180/65.3 |
| 6,953,099 B2 | * | 10/2005 | Kawasaki et al. | 180/65.1 |
| 7,025,160 B2 | * | 4/2006 | Awakawa | 180/68.5 |
| 7,144,647 B2 | * | 12/2006 | Sugita et al. | 429/32 |
| 2003/0012998 A1 | | 1/2003 | Bruck et al. | |
| 2003/0062204 A1 | * | 4/2003 | Kato et al. | 180/65.1 |

FOREIGN PATENT DOCUMENTS

| | | |
|---|---|---|
| JP | 2003-182379 | 7/2003 |
| JP | 2003-291857 | 10/2003 |
| JP | 2004-127787 | 4/2004 |

OTHER PUBLICATIONS

Office Action for Application No. 2004-14276, issued Aug. 29, 2006.

* cited by examiner

*Primary Examiner*—Frank B Vanaman
(74) *Attorney, Agent, or Firm*—Lahive & Cockfield, LLP; Anthony A. Laurentano (57) ABSTRACT

A vehicle mounting structure for a fuel cell includes a fuel cell box which accommodates a fuel cell stack inside. The fuel cell box includes a bottom frame on which the fuel cell stack is mounted, a top frame, the bottom frame and the top frame sandwiching the fuel cell stack, a side frame which forms a framework of the fuel cell box and which is connected to the bottom frame and to the top frame, a bottom holddown member which fixes a bottom portion of the fuel cell stack to the bottom frame, and a top holddown member which fixes a top portion of the fuel cell stack to the top frame. Structural members which are required to carry a fuel cell stack are reduced in weight and miniaturized in size while ensuring the desired installation rigidity when the fuel cell stack is carried.

14 Claims, 6 Drawing Sheets

VEHICLE MOUNTING STRUCTURE FOR FUEL CELL

BACKGROUND OF THE INVENTION

1. Field of the Invention

Priority is claimed on Japanese Patent Application No. 2004-14276, filed Jan. 22, 2004, the contents of which are incorporated herein by reference.

The present invention relates to a vehicle mounting structure for a fuel cell.

2. Description of Related Art

Conventionally, there is known a fuel cell vehicle which carries a fuel cell stack as a source of motive power, and travels by driving a propulsion motor using electric power generated by the fuel cell stack.

In such a fuel cell vehicle, endplates of a fuel cell stack are integrally fixed to a body frame which is the chassis of the vehicle (refer for example, to U.S. Published application No. 2003/0012998).

It is to be noted that in the fuel cell vehicle according to the aforementioned conventional technology, it has been desired to reduce the weight and miniaturize the size of the structural members which are required to carry the fuel cell stack, while ensuring the desired installation rigidity when the fuel cell stack is carried.

SUMMARY OF THE INVENTION

The present invention was conceived in view of the above situation and it is an object thereof to provide a vehicle mounting structure for a fuel cell, whereby it is possible to reduce the weight and miniaturize the size of the structural members which are required to carry a fuel cell stack while ensuring the desired installation rigidity when the fuel cell stack is carried.

To solve the aforementioned problems and achieve the object, according to the present invention, there is provided a vehicle mounting structure including a fuel cell box (fuel cell box 140 in the embodiment) which accommodates a fuel cell stack, the fuel cell box comprising: a bottom frame (fuel cell support frame 141 in the embodiment) on which the fuel cell stack is mounted; a top frame (top frames 145 in the embodiment), the bottom frame and the top frame sandwiching the fuel cell stack; a side frame (first and second side frames 143 and 144 in the embodiment) which forms a framework of the fuel cell box and which is connected to the bottom frame and to the top frame; a bottom holddown member (bottom holddown members 147 in the embodiment) which fixes a bottom portion of the fuel cell stack (bottom of endplates 11A in the embodiment) to the bottom frame; and a top holddown member (top holddown members 148 in the embodiment) which fixes a top portion of the fuel cell stack (top of the endplates 11A in the embodiment) to the top frame.

According to the vehicle mounting structure of the above construction, for example, compared to a case where the fuel cell stack is fixed on the bottom frame simply by bottom holddown members, the fuel cell stack itself can be made to function as the structural members of the fuel cell box in addition to the bottom frame and the top frame, enabling an increase in the installation rigidity of the fuel cell and the rigidity of the fuel cell box.

Furthermore, for example, compared to a case where the rigidity of the fuel cell box is increased not by providing the top frame, but by increasing the weight of the bottom frame and the side frame, which form the framework of the fuel cell box, the weight of the fuel cell box can be kept from being excessively increased.

Preferably, in the vehicle mounting structure as described above, the fuel cell stack comprises a pair of endplates (endplates 11A in the embodiment) which sandwich a plurality of fuel cells, and the bottom holddown member fixes a bottom portion of the endplates to the bottom frame, and the top holddown member fixes a top portion of the endplates to the top frame.

According to the vehicle mounting structure of the above construction, the endplates of the fuel cell stack can made to function as the structural members of the fuel cell box in addition to the bottom frame and the top frame, enabling an increase in the installation rigidity of the fuel cells and the rigidity of the fuel cell box.

Preferably, in the vehicle mounting structure as described above, the pair of endplates sandwich the fuel cell stack from a longitudinal direction of the vehicle.

According to the vehicle mounting structure of the above construction, the fuel cell stack which is affected by the vehicle's acceleration force and deceleration force can be firmly fixed in the fuel cell box.

Preferably, in the vehicle mounting structure as described above, the side frame is connected to a body frame (floor frames 105 and 106 in the embodiment) which forms a vehicle chassis.

According to the vehicle mounting structure of the above construction, the fuel cell box can be firmly fixed to the body frame.

DETAILED DESCRIPTION OF THE INVENTION

Hereunder is a description of a vehicle mounting structure for a fuel cell according to an embodiment of the present invention, with reference to the appended drawings.

Figure 1:
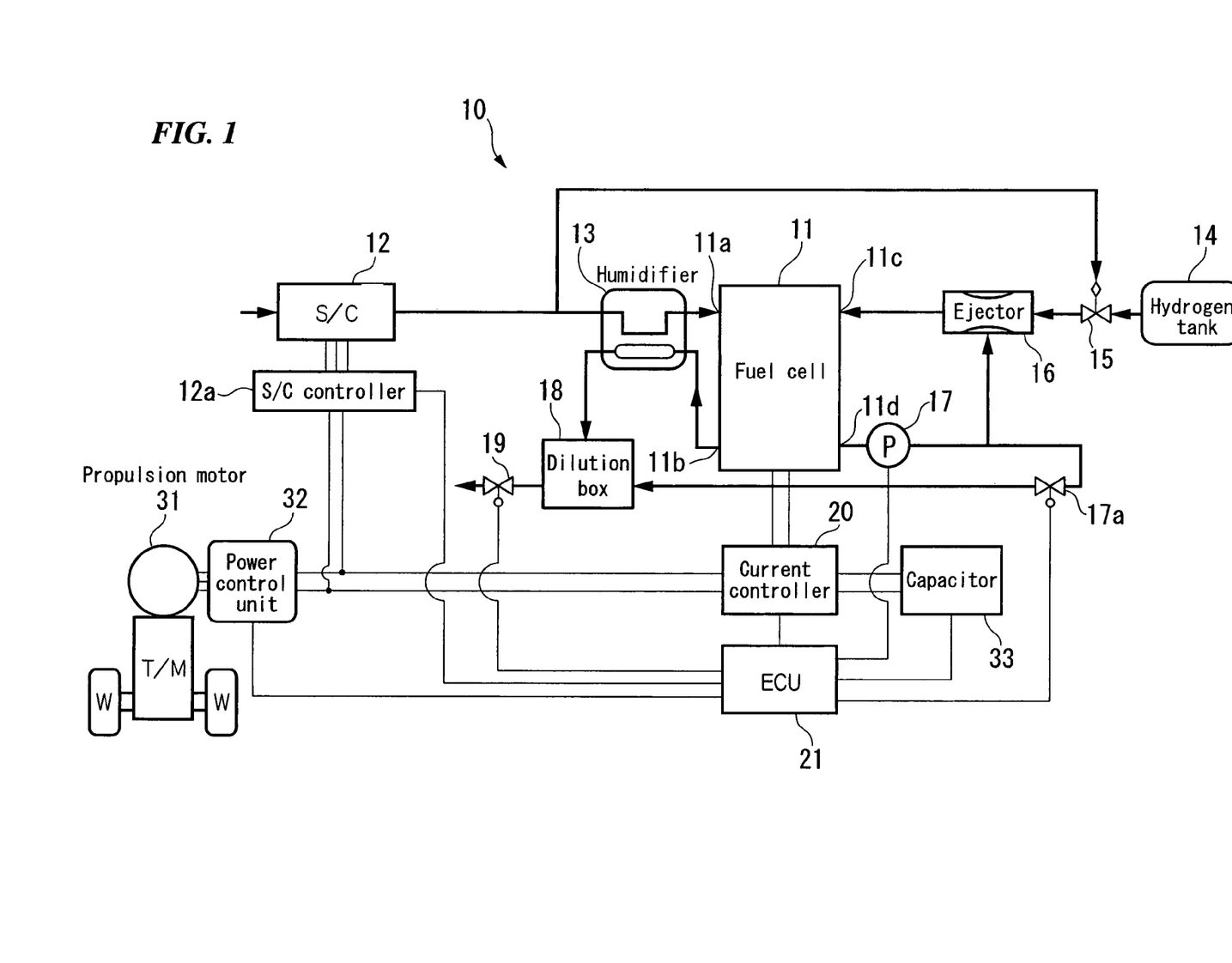
FIG. 1 is a block diagram of a fuel cell system according to an embodiment of the present invention.

A fuel cell system 10 according to the present embodiment comprises for example as shown in FIG. 1: a fuel cell 11, an air supply device 12, a humidifier 13, a hydrogen tank 14, a fuel supply control valve 15, an ejector 16, a fuel pump 17, a dilution box 18, a purge valve 19, a current controller 20, and a central control unit (ECU) 21. The fuel cell vehicle installed with this fuel cell system 10 comprises the fuel cell system 10, a propulsion motor 31, a power control unit (PCU) 32, and a capacitor 33.

The fuel cell 11 comprises a stack of fuel cell units made up of an electrolyte electrode structure holding solid polymer electrolyte membranes formed from a cation exchange membrane or the like, sandwiched between a fuel electrode (anode) formed from an anode catalyst and a gas diffusion layer, and an oxygen electrode (cathode) formed from a cathode catalyst and a gas diffusion layer, which is further sandwiched between a pair of separators. The stack body of the fuel cell units is sandwiched between a pair of endplates on opposite sides in the stacking direction.

Air which is an oxidizing gas (reactant gas) containing oxygen is supplied from the air supply device (S/C) 12, and humidified appropriately by the humidifier 13, then led into the cathode of the fuel cell 11. The anode is supplied with a fuel gas (reactant gas) comprising hydrogen which is supplied from the high pressure hydrogen tank 14 via the fuel supply control valve 15 and the ejector 16. The hydrogen ionized by the catalytic reaction on the anode catalyst of the anode, migrates towards the cathode through an appropriately humidified solid polymer electrolyte membrane. Electrons generated in association with this migration are drawn to an external circuit and used as direct current electric energy. At the same time, hydrogen ions, electrons and oxygen react to form water at the cathode.

The revolution speed of a motor (not shown) which drives the air supply device (S/C) 12 comprising an air compressor or the like, is controlled by an S/C controller 12a furnished with for example a pulse width modulation (PWM) inverter, by means of pulse width modulation (PWM), based on a control command of the input from the ECU 21. The S/C controller 12a is connected in parallel with the current controller 20 and the capacitor 33.

The humidifier 13 comprises a water permeable membrane such as a hollow fiber membrane, and uses the air discharged from the air discharge port 11b in the fuel cell 11 as the humidifying gas for the air supplied from the air supply device (S/C) 12 to the air supply port 11a as a reactant gas. That is, when the air and the discharged air are made to contact through the water permeable membrane, the moisture contained in the discharged air (especially steam) is supplied as water vapor into the air after it has permeated through the pores of the water permeable membrane.

Moreover, the discharged air from the humidifier 13 is led into the dilution box 18 to be described later.

The hydrogen as fuel for the fuel cell 11 is first supplied from the high pressure hydrogen tank 14 to the fuel supply control valve 15.

The fuel supply control valve 15 is, for example, an air type proportional pressure control valve, and is set using air pressure supplied from the air supply device (S/C) 12 as a signal pressure, so that the pressure of the hydrogen flowing through the fuel supply control valve 15 at the outlet of the fuel supply control valve 15 is within a predetermined range according to the signal pressure.

The hydrogen flowing through the fuel supply control valve 15 flows through the ejector 16 and is supplied from the hydrogen supply port 11c into the anode of the fuel cell 11.

Moreover, a part of the unreacted gas discharged from the hydrogen discharge port 11d in the fuel cell 11 is led into the ejector 16 by means of the hydrogen pump 17. The hydrogen supplied from the hydrogen tank 14 and the discharged gas from the fuel cell 11 are mixed in the ejector 16 and re-supplied into the fuel cell 11.

The ejector 16 sucks in the part of the discharged gas from the fuel cell 11 as a secondary flow due to the negative pressure generated in the vicinity of the high speed flow of the hydrogen gas passing through inside, and mixes this discharged gas with the hydrogen supplied from the hydrogen tank 14 to re-supply into the fuel cell 11, so that the discharged gas from the fuel cell 11 can be circulated.

Moreover, the discharged gas from the hydrogen discharge port 11d in the fuel cell 11 is led into the dilution box 18 through the discharge control valve 17a which is controlled on and off by means of the ECU 21.

The dilution box 18 mixes the hydrogen of the unreacted discharge gas which is discharged at the same time as when the nitrogen and the like mixed in the water and hydrogen remaining at the anode in the fuel cell 11 are discharged to the outside, with the air discharged from the cathode so as to reduce the hydrogen concentration below a predetermined concentration, and then discharges it to the outside (such as into the atmosphere) through the purge valve 19.

The generated current drawn from the fuel cell 11 is input into the current controller 20. The capacitor 33 comprising for example an electric double layer capacitor or an electrolytic capacitor as an electric accumulator, is connected to the current controller 20.

The current controller 20 comprises for example a DC-DC chopper or the like, and controls the current value of the generated current drawn from the fuel cell 11, based on the current command value from the output of the ECU 21, that is, the power generation command for the fuel cell 11.

Moreover, the fuel cell 11 and the capacitor 33 are connected in parallel via the current controller 20, with electrical loads such as the power control unit 32 which controls the propulsion motor 31, and the S/C controller 12a which controls a motor (not shown) that drives the air supply device (S/C) 12.

Hereunder is a description of a vehicle mounting structure of the fuel cell system 10 comprising the abovementioned construction, with reference to FIG. 2 to FIG. 6.

Figure 2:
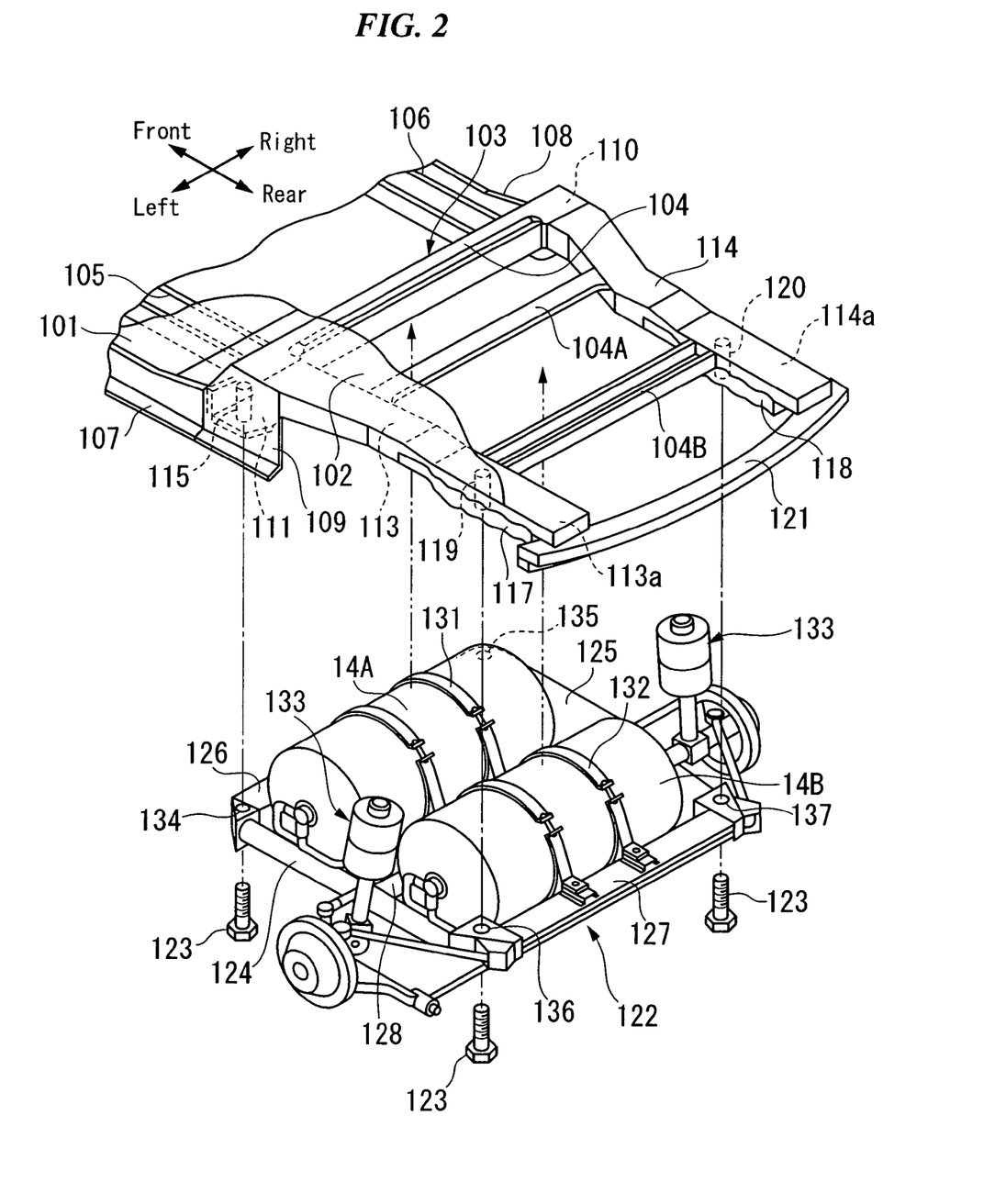
FIG. 2 is an exploded perspective view of main parts of a vehicle mounting structure of the fuel cell system shown in FIG. 1.
Figure 3:
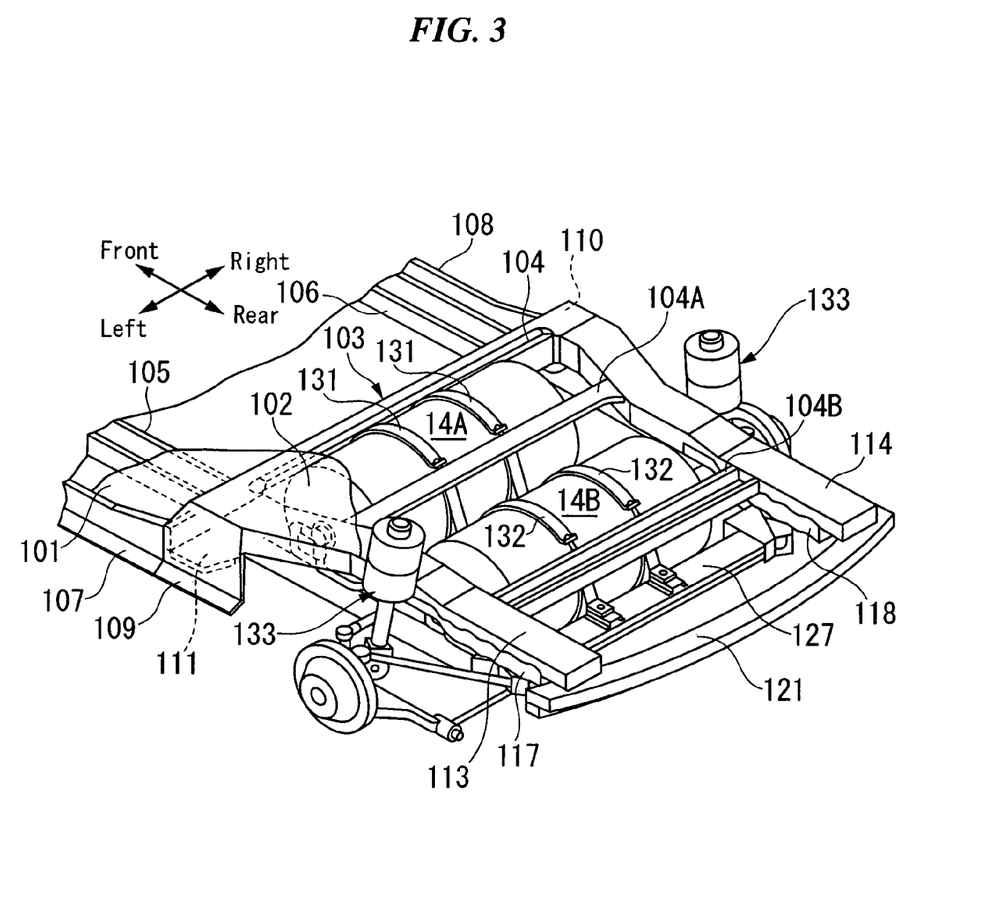
FIG. 3 is a perspective view of the main parts of the vehicle mounting structure of the fuel cell system shown in FIG. 1.

For example, as shown in FIG. 2, a rear floor 102 which is formed with a step raising rearwards, is joined to the rear edge of a front floor 101 constituting the vehicle floor. A crossmember 104 which forms the chassis of the vehicle, is joined onto the rear side of a stepped portion 103 of the rear floor 102. Floor frames 105 and 106 which form the chassis of the vehicle are respectively connected onto the undersurface of the front floor 101 towards the outside on the left and right along the vehicle lengthwise direction.

Inside sills 107 and 108 are respectively connected to the left and right edges of the front floor 101. An inside sill extension 109 is provided at the rear end of the inside sill 107 and an inside sill extension 110 is provided at the rear end of the inside sill 108. The inside sills 107 and 108 are members that are joined to outside sills (not shown) to form the chassis of the vehicle.

A front bracket 111 is joined onto the inner surface of the inside sill extension 109 and a front bracket 112 is joined onto the inner surface of the inside sill extension 110.

The front brackets 111 and 112 are joined to: rear frames 113 and 114 being members that are joined on the undersurface of the rear floor 102 to form the chassis of the vehicle, to the undersurface of the crossmember 104, and to the floor frames 105 and 106. As a result the front ends of the rear frames 113 and 114 are connected to the inside sills 107 and 108 and the floor frames 105 and 106 via the front brackets 111 and 112.

A rear bracket 117 is attached onto the undersurface of the rear end of the rear frame 113 and a rear bracket 118 is attached onto the undersurface of the rear end of the rear frame 114.

Here, two crossmembers 104A and 104B are joined towards the front and back between the left and right rear frames 113 and 114. The respective rear ends of the frames 113 and 114, specifically the rear brackets 117 and 118, are attached with a bumper beam 121.

Moreover, a sub frame 122 is fixed from beneath to respective collar nuts 115, 116, 119, and 120 which are provided on the front brackets 111 and 112 and the rear brackets 117 and 118, using four bolts 123.

As shown in FIG. 2, the sub frame 122 is a member which is formed into a rectangular frame shape using left and right frame members 124 and 125 and front and rear frame members 126 and 127, and a crossbeam 128 is provided in the vehicle widthwise direction. Two hydrogen tanks 14A and 14B serving as the hydrogen tank 14, are fixed into spaces divided by this crossbeam 128, by fastening with respective bands 131 and 132. Suspension units 133 are attached to the sub frame 122.

Moreover, insertion parts 134 and 135 for the bolts 123 which are inserted into the aforementioned collar nuts 115 and 116, are provided at corners of the front ends of the left and right frame members 124 and 125 and the opposite ends of the front frame member 126. Insertion parts 136 and 137 for the bolts 123 which are inserted into the aforesaid collar nuts 119 and 120, are provided at corners of the rear ends of the left and right frame members 124 and 125 and the opposite ends of the rear frame member 127.

The bolts 123 are inserted through the respective insertion parts 134, 135, 136 and 137 of the sub frame 122 constituted in this manner, and then these bolts 123 are inserted into the collar nuts 115, 116, 119, and 120 which are attached to the front brackets 111 and 112 and the rear brackets 117 and 118 of the rear frames 113 and 114, and tightened securely to thereby secure the sub frame 122 to the rear frames 113 and 114.

Figure 4:
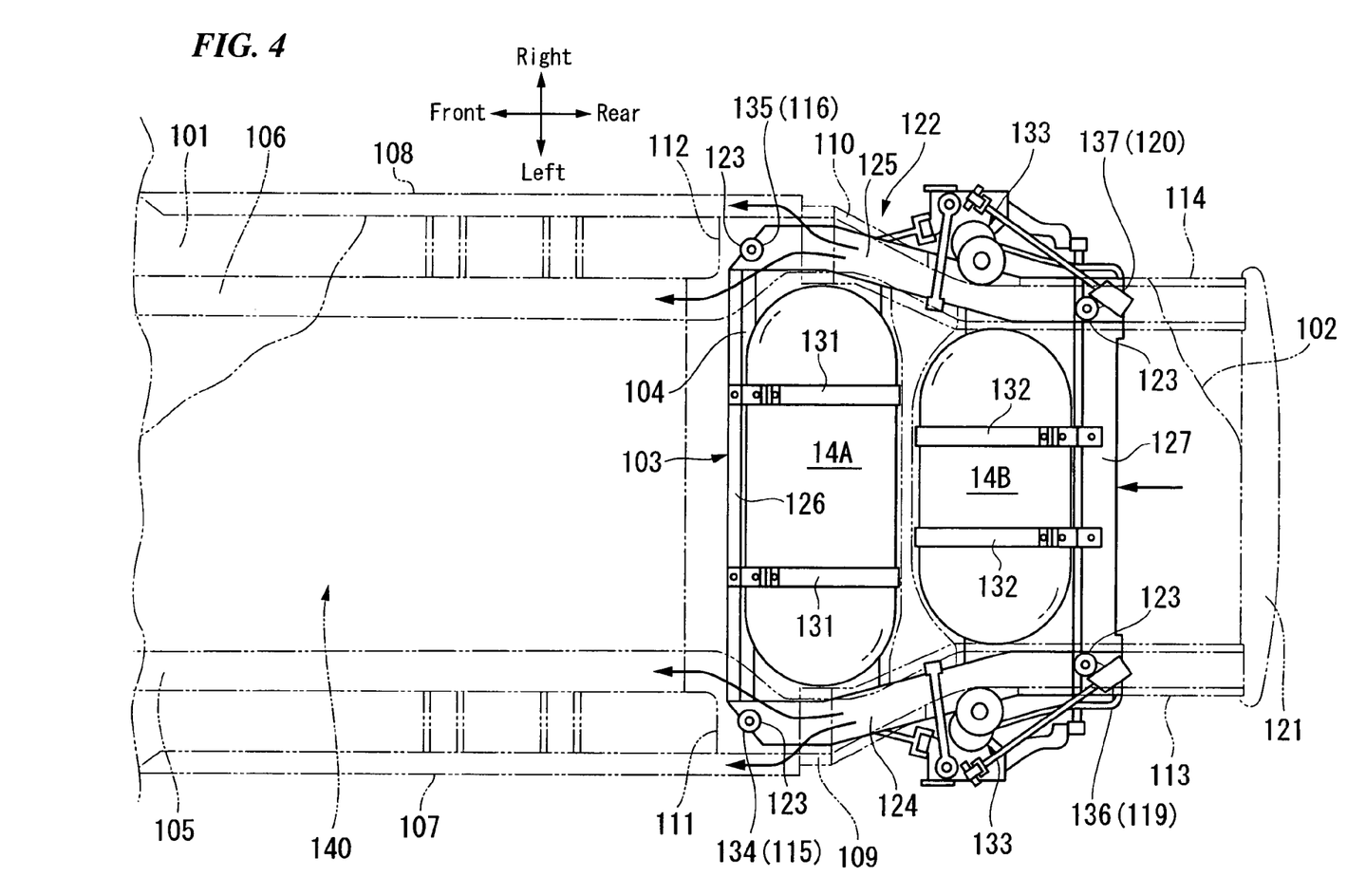
FIG. 4 is a plan view of the main parts of the vehicle mounting structure of the fuel cell system shown in FIG. 1, seen from top to bottom in the vehicle vertical direction.
Figure 5:
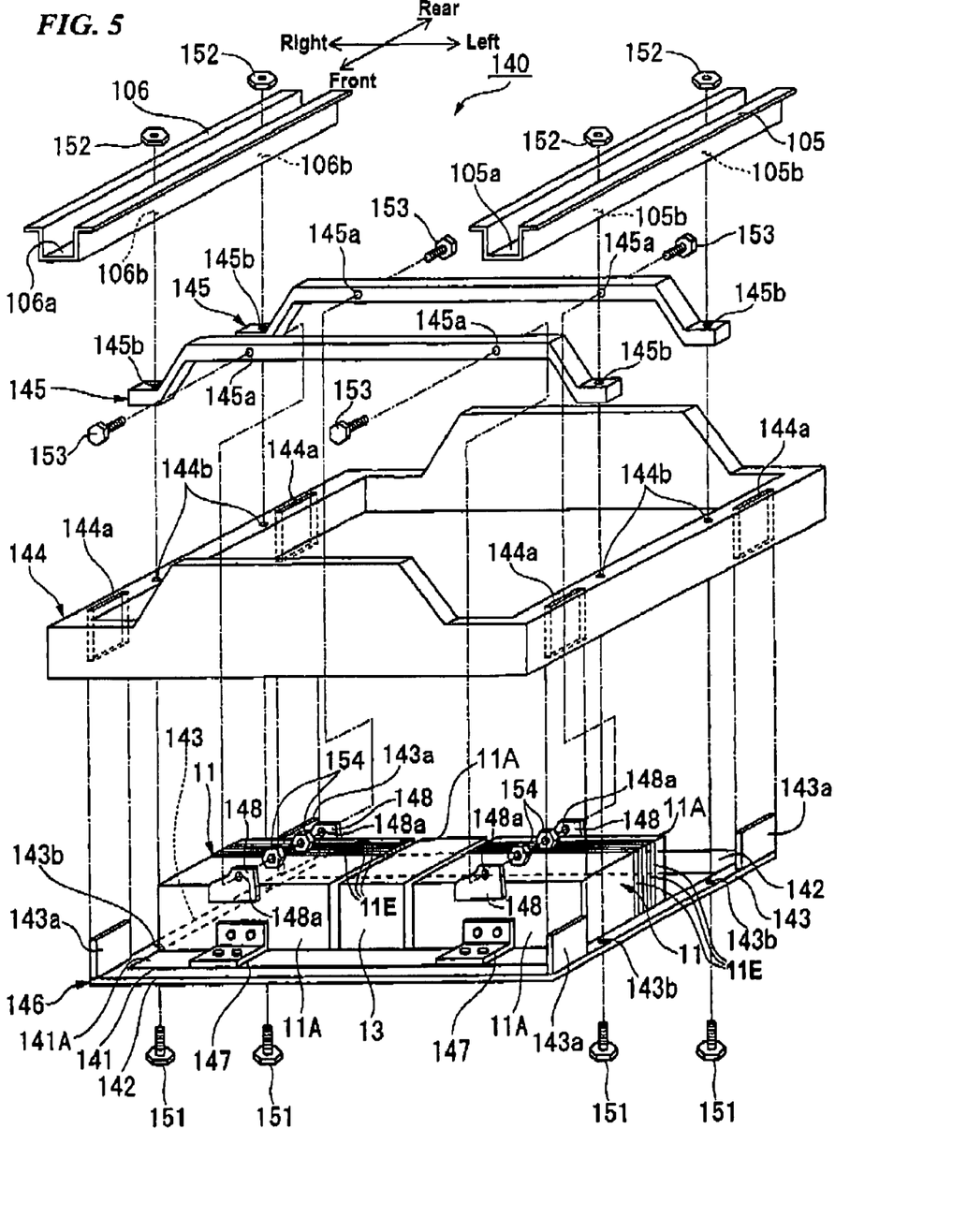
FIG. 5 is an exploded perspective view of a fuel cell box.
Figure 6:
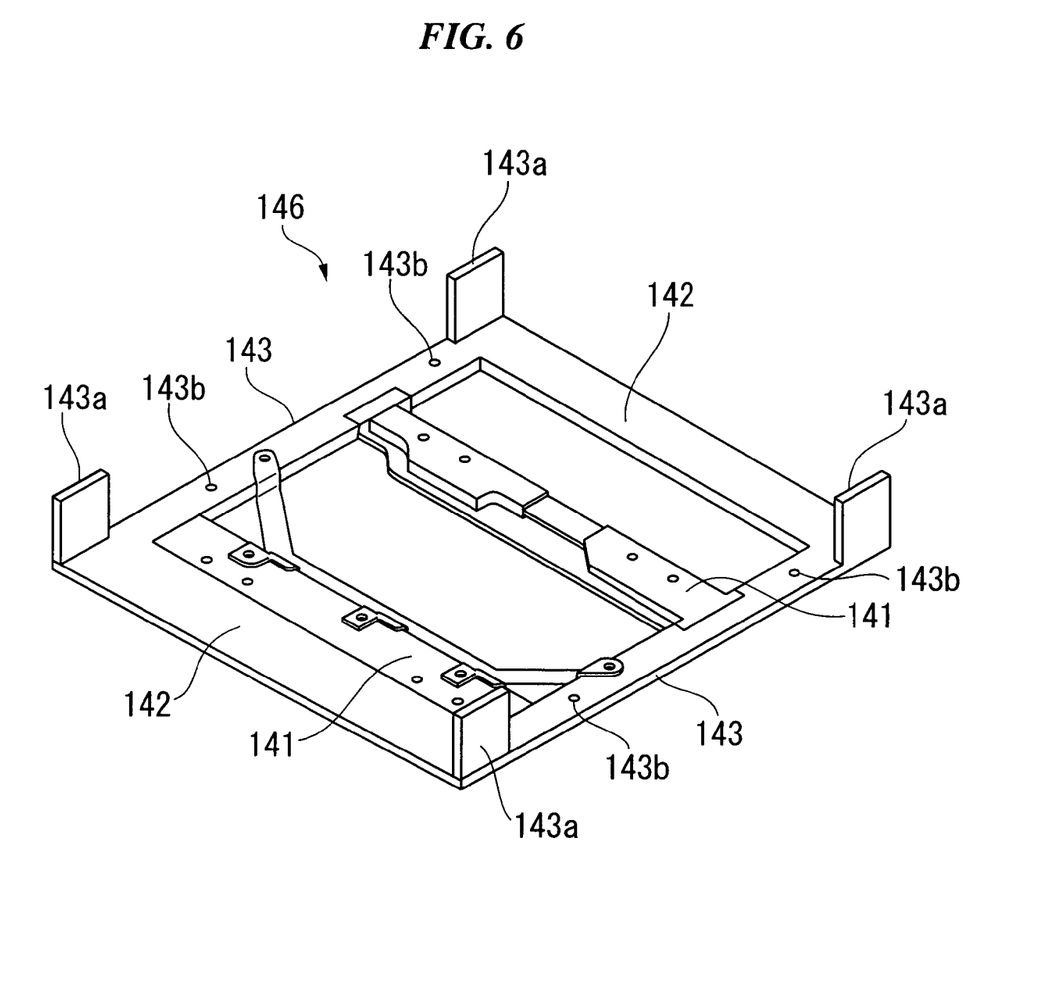
FIG. 6 is a perspective view of a frame body of the fuel cell box shown in FIG. 5.

As shown in FIG. 4 to FIG. 6, a fuel cell box 140 which accommodates and secures the fuel cell 11 and auxiliary units of the fuel cell 11 (for example, the humidifier 13, the ejector 16, the fuel pump 17, the dilution box 18, and the like) inside, is joined to the left and right floor frames 105 and 106 under the front floor 101.

The fuel cell box 140 comprises fuel cell support frames 141, bottom frames 142, first and second side frames 143 and 144, and top frames 145 which form the framework.

For example, as shown in FIG. 6, an approximately rectangular frame body 146 is formed by joining pairs of ends of the two bottom frames 142 and the two first side frames 143 that are arranged facing each other. Furthermore, the two fuel cell support frames 141 are connected to the two first side frames 143 at predetermined positions inside of the frame body 146.

The stacking direction of the plurality of fuel cell units (11E) constituting the fuel cell 11 is set in the vehicle lengthwise direction. The stack body of fuel cell units is sandwiched between a pair of endplates 11A from stacking direction (that is vehicle lengthwise direction) opposite sides.

As shown in FIG. 5 and FIG. 6 for example, in the frame body 146 where the two first side frames 143 are arranged along the vehicle lengthwise direction, two fuel cells 11 are mounted on the fuel cell support frames 141 so as to span between the two fuel cell support frames 141.

The two fuel cells 11 are arranged to sandwich the humidifier 13 from the opposite sides in the vehicle widthwise direction for example. The respective fuel cells 11 are fixed onto the fuel cell support frames 141 by for example, securing and fixing bottom holddown members 147 of approximate L-shaped cross-section plates to the bottom of the endplates 11A and the top surfaces 141A of the fuel cell support frames 141 by fasteners such as bolts.

Moreover, projections 143a projecting upward in the vehicle vertical direction are formed at the opposite ends of the first side frame 143 extending in the vehicle lengthwise direction.

The second side frame 144 is formed in a rectangular frame shape for example, and is provided with fitting holes 144a for installing the projections 143a of the first side frame 143.

The first side frame 143 and the second side frame 144 are connected by installing the projections 143a of the first side frame 143 into the fitting holes 144a of the second side frame 144, so that the periphery of the two fuel cells 11 and the humidifier 13 that are mounted on the fuel cell support frame 141 are surrounded by the second side frame 144.

Bolt installation holes 143b which are bored through in the vehicle vertical direction are provided in the first side frame 143. Through holes 144b which lead to the bolt installation holes 143b on the first side frame 143 are provided in the second side frame 144.

Over a top position in the vehicle vertical direction of the two fuel cells 11 that are mounted on the fuel cell support frames 141, are arranged two rectangular tubular top frames 145 extending in the vehicle widthwise direction. Two bolt installation holes 145a which are bored through in the vehicle lengthwise direction are formed in the respective top frame 145.

Moreover, top holddown members 148 projecting over the top end of the fuel cells 11 upward in the vehicle vertical direction are formed at the tops of the end plates 11A of the fuel cells 11. Through holes 148a which are bored through in the vehicle lengthwise direction and lead toward the bolt installation holes 145a of the top frames 145 are formed in these top holddown members 148.

Furthermore, through holes 145b which are bored through in the vehicle vertical direction and lead toward the through holes 144b of the second side frame 144 are provided in opposite ends of the top frames 145 extending in the vehicle widthwise direction.

Through holes 105b and 106b which are bored through in the vehicle vertical direction and lead toward the through holes 145b of top frames 145 are formed in the respective bottom walls 105a and 106a of the cross-sectional approximate U-shaped floor frames 105 and 106.

Then, for example, the bolts 151 are installed sequentially from the bottom of the first side frame 143, into the bolt installation holes 143b of the first side frame 143, the through holes 144b of the second side frame 144, the through holes 145b of the top frames 145, and the through holes 105b of the floor frame 105 or the through holes 106b of the floor frame 106, and fastened into nuts 152, so as to secure the first side frame 143, the second side frame 144, the top frames 145, and the floor frame 105 or the floor frame 106.

Furthermore, the bolts 153 are installed sequentially along the vehicle lengthwise direction into the bolt installation holes 145a of the top frames 145 and the through holes 148a of the top holddown member 148 formed on the top of the endplates 11A, and fastened into nuts 154, so as to secure the fuel cells 11 to the top frames 145.

In the vehicle mounting structure of the fuel cell system 10 having the above construction, the fuel cells 11 are fixed by sandwiching between the fuel cell support frames 141 and the top frames 145 from opposite sides in the vehicle vertical direction. Therefore, for example, compared to a case where the fuel cells 11 are fixed on the fuel cell support frames 141 simply by the bottom holddown members 147, the endplates 11A of the fuel cells 11 can be made to function as structural members of the fuel cell box 140 in addition to the fuel cell support frames 141 and the top frames 145, enabling an increase in the installation rigidity of the fuel cells 11 and the rigidity of the fuel cell box 140.

Furthermore, by forming the top frames 145 in a tubular shape, the weight can be kept from being excessively increased. For example, compared to a case where the rigidity of the fuel cell box 140 is increased not by providing the top frames 145, but by increasing the weight of the fuel cell support frames 141, the bottom frames 142, and the first and second side frames 143 and 144, which form the framework of the fuel cell box 140, the weight of the fuel cell box 140 can be kept from being excessively increased.

Moreover, together with the increase in rigidity of the fuel cell box 140, the characteristic frequency of the fuel cell box 140 can be increased, so that the occurrence of resonance in a relatively low frequency range due to vehicle vibration received from the road surface while the vehicle is travelling can be suppressed.

With the vehicle mounting structure for a fuel cell of the present invention, the fuel cell itself can be made to function as the structural members of the fuel cell box in addition to the fuel cell support frame and the top frame, enabling an increase in installation rigidity of the fuel cell and the rigidity of the fuel cell box.

Furthermore, for example, compared to a case where the rigidity of the fuel cell box is increased not by providing the top frame, but by increasing the weight of the fuel cell support frame and the side frame, which form the framework of the fuel cell box, the weight of the fuel cell box can be kept from being excessively increased.

With the vehicle mounting structure for a fuel cell according to another embodiment of the present invention, the endplates of the fuel cell can be made to function as the structural members of the fuel cell box, enabling an increase in installation rigidity of the fuel cell and the rigidity of the fuel cell box.

With the vehicle mounting structure for a fuel cell according to another embodiment of the present invention, the fuel cell which is affected by the vehicle's acceleration force and deceleration force can be firmly fixed in the fuel cell box.

With the vehicle mounting structure for a fuel cell according to another embodiment of the present invention, the fuel cell box can be firmly fixed to the body frame.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle mounting structure including a fuel cell box which accommodates a fuel cell stack, said fuel cell box comprising:
    a bottom frame on which said fuel cell stack is mounted;
    a top frame, said bottom frame and said top frame sandwiching said fuel cell stack;
    a side frame which forms a framework of said fuel cell box and which is connected to said bottom frame and to said top frame;
    a plurality of bottom holddown members to attach a bottom portion of said fuel cell stack to said bottom frame;
    a plurality of top holddown members to attach a top portion of said fuel cell stack to said top frame, wherein
    said fuel cell stack comprises a pair of endplates which sandwich a plurality of fuel cells,
    said plurality of bottom holddown members attach a bottom portion of said endplates to said bottom frame,
    said plurality of top holddown members attach a top portion of said endplates to said top frame,
    said pair of endplates sandwich said fuel cell stack along a longitudinal direction extending from a front of a vehicle to a rear of the vehicle; and
    the vehicle mounting structure further comprising a plurality of bolts extending in said longitudinal direction, wherein said pair of endplates are attached to said top frame via said top holddown members by said plurality of bolts.

2. A vehicle mounting structure according to claim 1, wherein said side frame is connected to a body frame which forms a vehicle chassis.

3. A vehicle mounting structure according to claim 1, wherein said fuel cell box further comprises:
    a pair of support frames provided on the bottom frame, the pair of support frames forming a portion of a top surface of the bottom frame.

4. A vehicle mounting structure according to claim 3, wherein said fuel cell stack is mounted on the pair of support frames and spans between the pair of support frames.

5. A vehicle mounting structure according to claim 1, wherein:
    the bottom frame comprises a plurality of projections projecting outwardly therefrom;
    the side frame comprises a plurality of fitting holes corresponding to the plurality of projections of the bottom frame, wherein the bottom frame and the side frame are coupled together by disposing the plurality of projections of the bottom frame into the plurality of fitting holes of the side frame.

6. A vehicle mounting structure according to claim 1, wherein the top frame has a tubular shape.

7. A vehicle mounting structure, comprising:
    a fuel cell box disposed below a pair of floor frames extending in a longitudinal direction extending from a front of a vehicle to a rear of said vehicle, said fuel cell box accommodating a fuel cell stack comprising a front endplate and a rear endplate which sandwich a plurality of fuel cells stacked in the longitudinal direction from the front to the rear of said vehicle, said fuel cell box including:
        a bottom frame on which said fuel cell stack is mounted;
        a pair of top frames, said top frames extending perpendicularly to said pair of floor frames; and
        a pair of side frames which forms a framework of said fuel cell box and which is connected to said bottom frame and to said pair of top frames, said pair of side frames extending in said longitudinal direction and connected to an undersurface of said pair of floor frames;
    an L-shaped front plate connected to a bottom portion of said front endplate and to a top surface of said bottom frame;
    an L-shaped rear plate connected to a bottom portion of said rear endplate and to a top surface of said bottom frame;
    a front plate connected to a top portion of said front endplate and a rear surface of said pair of top frames; and
    a rear plate connected to a top portion of said rear endplate and a front surface of said pair of top frames.

8. A vehicle mounting structure according to claim 7, wherein both ends of said pair of top frames are sandwiched between a top surface of said side frame and the under surface of said floor frame.

9. A vehicle mounting structure according to claim 7, wherein said fuel cell box further comprises:
    a pair of support frames provided on the bottom frame, the pair of support frames forming a portion of the top surface of the bottom frame.

10. A vehicle mounting structure according to claim 9, wherein said fuel cell stack is mounted on the pair of support frames and spans between the pair of support frames.

11. A vehicle mounting structure according to claim 7, wherein:
- the bottom frame comprises a plurality of projections projecting outwardly therefrom;
- the pair of side frames comprise a plurality of fitting holes corresponding to the plurality of projections of the bottom frame, wherein the bottom frame and the pair of side frames are coupled together by disposing the plurality of projections of the bottom frame into the plurality of fitting holes of the pair of side frames.

12. A vehicle mounting structure according to claim 7, wherein the pair of top frames have a tubular shape.

13. A vehicle mounting structure including a fuel cell box which accommodates a fuel cell stack, said fuel cell box comprising:
- a bottom frame on which said fuel cell stack is mounted;
- a top frame, said bottom frame and said top frame sandwiching said fuel cell stack;
- a pair of support frames provided on the bottom frame, the pair of support frames forming a portion of a top surface of the bottom frame;
- a side frame which forms a framework of said fuel cell box and which is connected to said bottom frame and to said top frame;
- a plurality of bottom holddown members to attach a bottom portion of said fuel cell stack to said bottom frame; a plurality of top holddown members to attach a top portion of said fuel cell stack to said top frame, wherein said fuel cell stack comprises a pair of endplates which sandwich a plurality of fuel cells,
- said plurality of bottom holddown members attach a bottom portion of said endplates to said bottom frame,
- said plurality of top holddown members attach a top portion of said endplates to said top frame; and
- the vehicle mounting structure further comprising a plurality of bolts extending in a stacking direction of said plurality of fuel cells, wherein said pair of endplates are attached to said top frame via said top holddown members by said plurality of bolts.

14. A vehicle mounting structure according to claim 13, wherein said fuel cell stack is mounted on the pair of support frames and spans between the pair of support frames.

* * * * *